United States Patent
Zhang (10) Patent No.: US 9,915,423 B2
(45) Date of Patent: Mar. 13, 2018

(54) ROTATIONAL FLOW AND SINK FLOW-COUPLING INTEGRATED SYSTEM FOR ULTRA-CLEAN DESULPHURATION AND DEDUSTING AND DESULPHURATION AND DEDUSTING METHOD THEREFOR

(71) Applicant: BEIJING SPC ENVIRONMENT PROTECTION TECH CO., LTD, Beijing (CN)

(72) Inventor: Kaiyuan Zhang, Beijing (CN)

(73) Assignee: Beijing SPC Environment Protection Tech Co., Ltd. (CN)

( * ) Notice: Subject to any disclaimer, the term of this patent is extended or adjusted under 35 U.S.C. 154(b) by 0 days.

(21) Appl. No.: 15/315,367

(22) PCT Filed: Feb. 12, 2015

(86) PCT No.: PCT/CN2015/072843
§ 371 (c)(1),
(2) Date: Jan. 23, 2017

(87) PCT Pub. No.: WO2016/050030
PCT Pub. Date: Apr. 7, 2016

(65) Prior Publication Data
US 2017/0198908 A1    Jul. 13, 2017

(30) Foreign Application Priority Data

Sep. 29, 2014    (CN) .......................... 2014 1 0513867

(51) Int. Cl.
*B01D 53/50*    (2006.01)
*B01D 53/78*    (2006.01)
(Continued)

(52) U.S. Cl.
CPC .............. *F23J 15/04* (2013.01); *B01D 45/12* (2013.01); *B01D 47/06* (2013.01); *B01D 53/48* (2013.01);
(Continued)

(58) Field of Classification Search
CPC .. B01D 53/1481; B01D 53/50; B01D 53/504; B01D 53/78; B01D 2257/302;
(Continued)

(56) References Cited

U.S. PATENT DOCUMENTS 6,270,544 B1 * 8/2001 Mencher ................ B01D 45/16
55/318
9,403,123 B2 * 8/2016 Rafidi .................... B01D 53/79

FOREIGN PATENT DOCUMENTS

CN        2057597       5/1990
CN      201735324      2/2011
(Continued)

OTHER PUBLICATIONS

International Search Report for International Application No. PCT/CN2015/072843, dated Jul. 4, 2016.

*Primary Examiner* — Timothy C Vanoy
(74) *Attorney, Agent, or Firm* — Kwan & Olynick LLP (57) ABSTRACT

An example rotational flow and sink flow coupling integrated system may include a spray layer, a slurry pool, a circulating pump, a rotational flow and sink flow coupling device, and a tube bundle-type dedusting and demisting device. The rotational flow and sink flow coupling device, which includes a plurality of rotational flow and sink flow coupling units and supporting beams for supporting the rotational flow and sink flow coupling device which are located therebelow, is mounted above the slurry pool and below the spray layer. The tube bundle-type dedusting and demisting device is arranged on top of a tower body; each (Continued)

rotational flow and sink flow coupling unit includes a rotational flow cylinder, a rotational flow rotor, and a flow guiding device. Both the components described in this paragraph and any other additional components may be implemented in various ways according to the present disclosure.

14 Claims, 6 Drawing Sheets

(51) Int. Cl.
*B01D 47/06* (2006.01)
*F23J 15/04* (2006.01)
*B01D 53/80* (2006.01)
*B01D 53/48* (2006.01)
*B01D 45/12* (2006.01)

(52) U.S. Cl.
CPC ........ *B01D 53/80* (2013.01); *B01D 2251/404* (2013.01); *B01D 2251/608* (2013.01); *B01D 2257/302* (2013.01)

(58) Field of Classification Search
CPC ............ B01D 2258/0283; B01D 46/10; B01D 46/00; B01D 47/06
See application file for complete search history.

(56) References Cited

FOREIGN PATENT DOCUMENTS

| | | | |
|---|---|---|---|
| CN | 102764582 | 11/2012 | |
| CN | 102836633 | 12/2012 | |
| CN | 103861402 | 6/2014 | |
| CN | 102764582 | 3/2015 | |
| KR | 20160143801 A * | 12/2016 | ............. B01D 47/06 |

* cited by examiner

ROTATIONAL FLOW AND SINK FLOW-COUPLING INTEGRATED SYSTEM FOR ULTRA-CLEAN DESULPHURATION AND DEDUSTING AND DESULPHURATION AND DEDUSTING METHOD THEREFOR

RELATED APPLICATION

This application claims priority to the PCT application number PCT/CN2015/072843, filed Feb. 12, 2015, which claims priority to the Chinese patent application number 2014105138677, filed Sep. 29, 2014. Both of the above-identified patent applications are hereby incorporated by reference in their entireties.

TECHNICAL FIELD

The present disclosure relates to integrated systems and methods for desulphurization and dedusting, and specifically relates to integrated systems and methods for deep desulphurization, dedusting and demisting of flue gas containing sulphur dioxide and powder dust.

BACKGROUND

A cyclone tower in the field of boiler flue gas desulphurization may present the following technical challenges. The desulphurization efficiency is relatively low (around 80%) due to short gas-liquid contact time on tower plates; CaCO3 is not suitable for use as a sulfur fixing agent; the structure of the cyclone tower is complex and is prone to the formation of filth; and The desulphurization efficiency is decreased with the increase of the tower diameter. With the cyclone tower, air is let in tangentially, and an area of low efficiency tends to form in the center. Accordingly, a rotational flow and sink flow coupling desulphurization technology is developed in the industry, which is an upgrading technology based on a pneumatic emulsification technology. The pneumatic emulsification technology is suitable for flue gas desulphurization of small boilers with significant amplification effects in amplification experiments, albeit certain constraints as well. Moreover, most of the current flue gas desulphurization technologies adopt an empty tower technology, i.e., flue gas, after entering an absorption tower, directly reacts with slurry sprayed from above without passing through the device. Thus, the flue gas and slurry are in short circuit, some flue gas leaves the absorption tower before reaction, and the flue gas has short residence duration, thereby resulting in low desulphurization efficiency.

SUMMARY

An example rotational flow and sink flow coupling integrated system for ultra-clean desulphurization and dedusting may comprise a spray layer mounted in a tower body, a slurry pool arranged below the tower body, a circulating pump mounted in the slurry pool, and a rotational flow and sink flow coupling device which is mounted above the slurry pool and below the spray layer, and a tube bundle-type dedusting and demisting device arranged on the top of the tower body.

In some implementations, the rotational flow and sink flow coupling device comprises a plurality of rotational flow and sink flow coupling units and supporting beams for supporting the rotational flow and sink flow coupling device located below the rotational flow and sink flow coupling units. Adjacent rotational flow and sink flow coupling units are connected with a closing plate; each of the rotational flow and sink flow coupling units may comprise a rotational flow cylinder, which is provided with a rotational flow rotor and on the top of which a flow guiding device is arranged. The rotational flow rotor may comprise an inner cylinder body and rotational flow blades, and an inner diameter of the flow guiding device at a position where the flue gas flows out is less than that at a position where the flue gas flows in.

The tube bundle-type dedusting and demisting device may comprise a plurality of dedusting and demisting units, each of which may further comprise a flow guiding cylinder and a number of n turbulent flow rotors provided inside the flow guiding cylinder, where n≥1, the turbulent flow rotors being disposed up and down perpendicularly to the wall of the flow guiding cylinder.

In some implementations, the flow guiding cylinders are circular cylinders placed vertically.

In some implementations, the number, diameters and heights of the flow guiding cylinders are determined according to the following parameters: when the outlet dust content is less than or equal to 5 mg/Nm3, an average flow rate of flue gas flowing through a cross section of the flow guiding cylinder is 5 to 6 m/s, and its residence duration is 0.2 to 0.3 S.

In some implementations, the turbulent flow rotor comprises a number of blades which are evenly arranged in the annular area between the outer wall of a center cylinder and the inner wall of the flow guiding cylinder.

In some implementations, there is an angle of 20 degree to 55 degree between the blade of the turbulent flow rotor and the center cylinder, and a shielding rate between adjacent blades is −10% to 45%.

In some implementations, after gas is guided by the blade with an inclination angle of the blade, an actual speed of gas in rotary motion is greater than or equal to 8 m/s.

In some implementations, the center cylinder is a circular cylinder with the top end closed, and its cross sectional area is 15% to 50% of that of the flow guiding cylinder.

In some implementations, a water baffle ring is provided on the inner wall of the flow guiding cylinder of the bundle-type dedusting and demisting device, for forming a liquid film containing steady amount of liquid.

In some implementations, the thickness and height of the water baffle ring are determined for a maximum liquid holdup.

In some implementations, bleed holes are provided on the tube bundle-type dedusting and demisting device, for controlling the inner wall surface of the device to form a liquid film having uniform thickness and rotating at a high speed; the bleed holes are apertures which have the same rotating direction as that of the blades and are tangent to the inner wall surface of the flow guiding cylinder.

In some implementations, the tube bundle-type dedusting and demisting device has flushing assemblies allocated to each dedusting and demisting unit, wherein each flushing assembly is arranged on the central axis of the flow guiding cylinder of the dedusting and demisting unit, and comprises a flushing nozzle perpendicular to the inner wall of the flow guiding cylinder.

An example rotational flow and sink flow coupling integrated method for ultra-clean desulphurization and dedusting may comprise the following steps:

slurry oxidation and plaster crystallization: oxidized air is insufflated into the slurry pool, and fully mixed with limestone-plaster slurry under the action of a stirrer, so that calcium sulfite in the slurry is oxidized into calcium sulfate, and then calcium sulfate is crystallized into plaster particles;

slurry spraying and circulating: according to a state of initial flue gas and requirements on clean flue gas, the slurry processed in the step of slurry oxidation and plaster crystallization is pumped into multiple spray layers using a circulating pump for spraying;

rotational flow and sink flow coupling contact of gas and liquid and reaction of gas and liquid: rotational flow blades in the rotational flow and sink flow coupling device change the flow direction of the flue gas from bottom to top in the tower, to rotating upward at an increases speed; the slurry is sprayed on the spray layer, and after the slurry flowing from top to bottom comes in contact with the flue gas, a portion of flue gas converges to the center, and the flue gas that continues its rotational flow upward due to the constraints of a narrowed inner diameter of the flow guiding device converges with the slurry, the slurry descends toward the center for quick desulphurization and slurry washing to remove a portion of dust;

preliminary dedusting and demisting: the flue gas flowing upward at a high speed enters the tube bundle-type dedusting and demisting device, the turbulent flow rotors in the lower part of the dedusting and demisting device allow a large amount of mist drops and liquid particles in the flue gas and dust particles to collide with each other and agglomerate into larger particles, and then the larger particles precipitate;

further dedusting and demisting: after the liquid film comes in full contact with the mist drops and liquid particles and solid dust particles in the flue gas moving upward at a high speed in the tube bundle-type dedusting and demisting device, liquid is captured to achieve separation; and deep dedusting and demisting: the mist drops and liquid particles and solid dust particles in the flue gas that continues moving upward at a high speed rotate in a high speed with the flue gas to achieve centrifugal separation because of their difference in density from the flue gas, and are then thrown to the inner wall surface of the flow guiding cylinder of the tube bundle-type dedusting and demisting device, and annihilated after their coming in contact with the liquid film adhered to the wall surface of the device.

Embodiments of the present disclosure may provide the following technical advantages.

The system has a more efficient desulphurization effect, with an efficiency that can reach 99% or more. Contents of outlet sulfur dioxide can be reduced to 30 mg/Nm3 or less, and operating resistance is increased slightly. However, the work involved in configuration of the spray layer and the slurry circulating pump can be reduced, and the overall energy consumption is not increased.

The system has a great dedusting and demisting effect, contents of outlet dust can be 5 mg/Nm3 or less, and the droplet content can be 25 mg/Nm3 or less.

The system has no risk of blockage due to scale formation. A limited amount of flushing water is required, with a low flushing frequency.

The system is reliable to operate, easy to install, simple in maintenance, low in cost, and has a high cost-performance ratio.

Due to a rapid cooling and uniform distribution of flue gas in the gas-liquid rotational flow and sink flow coupling device, in addition to an enhanced desulphurization effect, the formation of water mist and dust entrainment in the flue gas can be reduced, and the load of subsequent demisting and dedusting is alleviated.

The tube bundle-type dedusting and demisting device has good effects and low operating resistance, and it can substitute for the conventional process of "demister+wet type electrostatic precipitator", providing a new option of a reliable and cheap process unit for dedusting and demisting of saturated flue gas.

For transformation projects, an initial common demister may be removed, and the tube bundle-type dedusting and demisting device may be readily mounted, with which an increased resistance of around 100 to 150 Pa is achieved, while other consumption in other operations are not required.

Reference numerals in the drawings:

1: a tower body, 2: a tube bundle-type dedusting and demisting device, 3: a spray layer, 4: a rotational flow and sink flow coupling device, 5: a slurry pool, 41: a rotational flow and sink flow coupling unit, 42: a supporting beam, 43: a rotational flow rotor, 44: a rotational flow cylinder, 45: a flow guiding device, 46: a closing plate, 431: an inner cylinder body, 432: a rotational flow blade, 21: a flow guiding cylinder, 22: a turbulent flow rotor, 23: a water baffle ring, 24: a bleed hole, 221: a center cylinder, 222: a blade 231: a primary water baffle ring, and 232: a secondary water baffle ring.

DETAILED DESCRIPTION

The principles and features of the present disclosure will now be described with reference to the accompanying drawings below, and the examples are only presented to illustrate the present disclosure and are not intended to limit the scope of the present disclosure.

Wet process purification of flue gas mainly depends on desulphurization. However, in order to improve the impact of clean flue gas on environment, requirements on dust (including plaster) and droplets therein have also become increasingly strict. Therefore, research on deep desulphurization, dedusting and demisting technology is necessary.

Wet process desulphurization generally adopts an empty tower spray technology. In order to achieve high desulphurization efficiency, a high liquid-gas ratio and multi-layer spraying are required, and in some efficiency improvement and transformation projects, two towers connected serially are needed to meet the requirements. In addition, due to the size and special structures of the absorption tower, bias flow of the flue gas entering an absorption tower is an unavoidable problem.

There are a variety of processing schemes for flue gas dedusting and demisting, but few can achieve both dedusting and demisting, especially efficient deep dedusting and demisting, on saturated wet flue gas containing a lot of mist drops.

At present, over 95% of flue gas from existing large coal-fired boilers in China is purified using a wet process desulphurization process. There are plaster slurry and dust in emitted low-temperature saturated clean flue gas, and basically no boilers are equipped with GGH (Flue Gas Heater), resulting in severe "plaster rain" phenomenon and a large amount of dust pollution and emission. The main cause for this problem is that demisters can only remove large droplets with a particle diameter of 15 µm or more, so that a large amount of fine slurry droplets contained in flue gas result in high emission of dust in clean flue gas.

For the existing dedusting and demisting process of purifying flue gas with a wet process, a process scheme of "demister+wet type electrostatic precipitator" may be used, or alternatively a process scheme of "GGH+bag deduster" may be used, so as to effectively reduce dust pollution and emissions. However, both process schemes have certain defects.

When the process scheme of "GGH+bag deduster" is employed, the GGH and the bag deduster have high operating resistance and high construction cost. What is more important is that there is a certain gas leakage rate with the GGH, causing a great impact on the desulphurization effect of the desulphurization system. The air pollutant emission standard of China has strict requirements of SO2 emission concentration (50 mg/Nm3 or less). SO2 concentration of most coal-fired flue gas is 2000 mg/Nm3 or more, so that the efficiency of the desulphurization system needs to be increased from 97.5% to 98% based on a 0.5% gas leakage rate of GGH, and the SO2 concentration of clean flue gas at the outlet of the absorption tower needs to be reduced from 50 mg/Nm3 to 40 mg/Nm3 to meet the emission requirements. If an increased gas leakage rate of GGH during operation is taken into account, then the desulphurization efficiency of the absorption tower has to be further improved. Therefore, the process has practical use in China.

When the process scheme of "demister+wet type electrostatic precipitator" is employed, it is possible to ensure high dedusting and demisting efficiency of clean flue gas at the outlet of the absorption tower, where the dust content of the clean flue gas at the outlet is less than 5 mg/Nm3. At present, this process is only used in a few newly built desulphurization absorption towers, mainly because the weight and size of a wet type electrostatic precipitator is massive, a newly built absorption tower should be designed according to this process scheme for the scheme to be implemented. In addition, since in this process scheme mist drops and dust particles are captured using a high voltage electric field, so a large number of high-voltage electrical devices are used. The electrode wires are made of expensive alloy materials, making construction of such high-voltage electrical devices expensive and its power consumption high in operation, which is also one of the reasons limiting the application thereof. The main reasons why it is difficult to implement the new process scheme by modifying and upgrading existing desulphurization towers include, first, the structural design of the original absorption tower cannot meet load requirements of an electrostatic precipitator; second, the demand in the site area for adjacent arrangement of a demister and a wet type electrostatic precipitator has also limited possibilities of its external deployment, adding the increased operating challenges in adjacent arrangement, resulting in further increase of the operating cost of this process scheme. Because a large number of high-voltage electrical devices are used in this process scheme, operation and maintenance is complicated and expensive, and technical requirements for their operation are high.

To solve the above-identified technical challenges as well as other technical challenges discussed in the present disclosure, the technologies described herein provide a rotational flow and sink flow coupling integrated system for ultra-clean desulphurization and dedusting and a desulphurization and dedusting method therefore, and aims to optimize the existing desulphurization technology, by enhancing the desulphurization effect, avoiding the defects of the existing dedusting and demisting technology. The system is simple in structure, reliable to operate, has significant improving effects, stable to operate, and low in energy consumption and in cost. Deep desulphurization, dedusting and demisting of flue gas, as well as ultra-clean emission can be achieved.

Embodiments of the present disclosure combine the conventional calcium-process desulphurization technology with the gas-liquid rotational flow and sink flow coupling and tube bundle-type dedusting and demisting technology, and organically combines the slurry spray and circulation, rotational flow and sink flow coupling contact and reaction of gas and liquid, slurry oxidation and plaster crystallization, and tube bundle-type dedusting and demisting of outlet flue gas in a desulphurization absorption tower to form a rotational flow and sink flow coupling integrated method and s system for ultra-clean desulphurization and dedusting, with which the desulphurization and dedusting effect is gradually strengthened from bottom to top. As a result, in the tube bundle-type dedusting and demisting device, the role of demisting enhances the dedusting effect.

Throughout the desulphurization process, the slurry is pumped from the slurry pool in the absorption tower into the slurry spray layer by a slurry circulating pump. Between the rotational flow and sink flow coupling device and the spray layer, the flue gas flows from bottom to top, and the slurry flows from top to bottom. Accordingly, so that gas comes in countercurrent contact with liquid overall, where there is a large gradient in concentration between reactants and its products, facilitating positive reaction, so that the sulfur dioxide contained in the initial flue gas and calcium sulfite concentration of the slurry after desulphurization can be reduced as much as possible, and achieving an improved desulphurization effect.

The main working principle of the rotational flow and sink flow coupling device according to an embodiment of the present disclosure is as follows. The rotational flow and sink flow coupling device has a function of achieving a uniform distribution of flue gas. When entering into the rotational flow and sink flow coupling device, the flue gas is blown to the wall of the rotational flow cylinder by the rotational flow blades in various units of the rotational flow and sink flow coupling device, and after the slurry flowing from the spray layer comes in contact with the flue gas, a portion of the slurry converges to the center. The rotational flow blades cause turbulence in the slurry and the flue gas, thereby increasing the gas-liquid mass transfer effect. The flue gas and the slurry flow move upward in the form of a rotational flow. When they reach the outlet of the flow guiding device, the inner diameter of the flow guiding device is narrowed, so that the flue gas becomes sink flow, and the slurry descends as a result of its being blocked. Rotational flow and sink flow coupling leads to a multiphase turbulent mixing, a gas-liquid mass transfer system for gas-liquid rotation, overturn and a great turbulence degree is formed in the space of the rotational flow and sink flow coupling device, in which gas, liquid and solids fully contact, thereby reducing gas-liquid film mass transfer resistance and improving the mass transfer rate. Efficient desulphurization of flue gas is performed in the above space, with a portion of dust being removed. After absorbing sulfur dioxide, the slurry descends to the slurry pool to form a plaster as byproduct which is to be emitted. In addition, the rotational flow and sink flow coupling device has an effect of rapidly cooling the flue gas.

The main working principle of the bundle-type dedusting and demisting device of the present disclosure is as follows. Mist drop liquid particles and solid dust particles have three motion states, i.e. agglomeration, capture and annihilation. In a state of agglomeration, when flue gas passes through the device, fine mist drop liquid particles entrained therein collide with each other or with dust particles in a gas flow moving at a high speed in the device to agglomerate to form larger particles, which then precipitate. In a state of capture, mist drop liquid particles and unremoved solid dust particles enter the device with gas, come in full contact with the liquid film having a certain steady amount of liquid on the flow guiding cylinder in the device, are then captured by liquid to be separated from the flue gas, and get in the liquid film. In a state of annihilation, mist drop liquid particles and unremoved solid dust particles rotate in the device at a high speed with the flue gas to achieve centrifugal separation because of its difference in density from the flue gas, are then thrown to the inner wall surface of the flow guiding cylinder and annihilated after coming in contact with the liquid film rotating at a high speed and having uniform thickness on the inner wall surface of the flow guiding cylinder. The tube bundle-type dedusting and demisting device has an effect of uniform redistribution of flue gas.

Additional details of implementations are now described in relation to the Figures.

Figure 1:
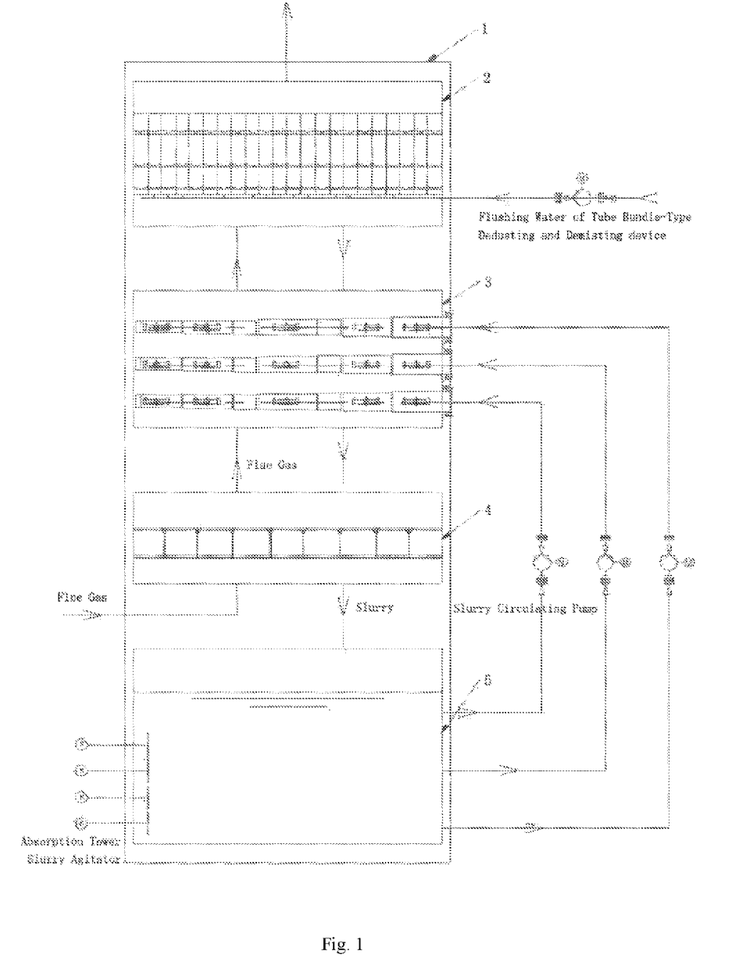
FIG. 1 is a schematic diagram of a system according to an embodiment of the present disclosure.

As shown in FIG. 1, a rotational flow and sink flow coupling integrated system for ultra-clean desulphurization and dedusting includes a spray layer 3 mounted in a tower body 1, a slurry pool 5 arranged below the tower body 1, a circulating pump 6 mounted in the slurry pool 5, a rotational flow and sink flow coupling device 4 mounted above the slurry pool 5 and below the spray layer 3, and a tube bundle-type dedusting and demisting device 2 arranged on the top of the tower body 1.

Figure 2:
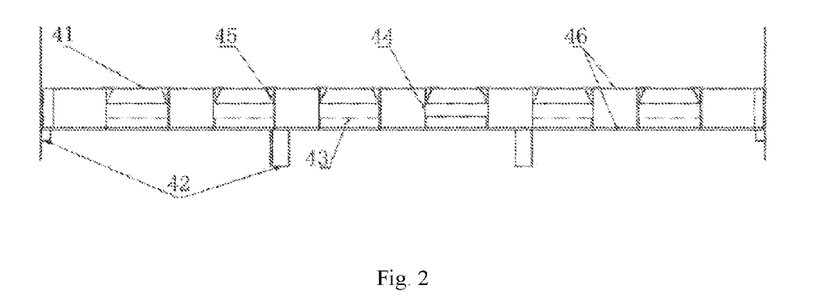
FIG. 2 is a schematic structural diagram of a rotational flow and sink flow coupling device according to an embodiment of the present disclosure.
Figure 5A:
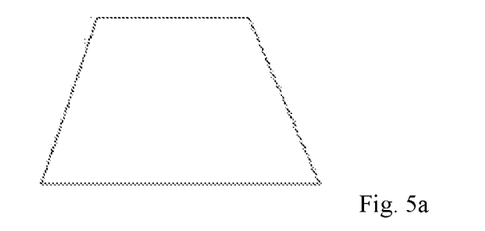
FIG. 5A-5C are cross section views of a flow guiding device according to an embodiment of the present disclosure.
Figure 5B:
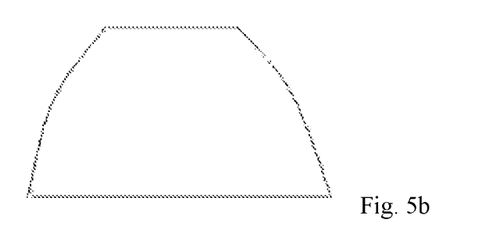
Figure 5C:
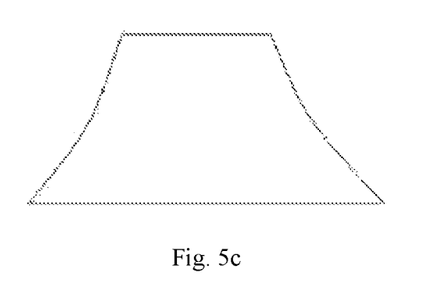

The rotational flow and sink flow coupling device 4 includes a plurality of rotational flow and sink flow coupling units 41 and support beams 42 for supporting the rotational flow and sink flow coupling device 4 located below the rotational flow and sink flow coupling units 41, where adjacent rotational flow and sink flow coupling units are connected with a closing plate 46, as shown in FIG. 2. Each of the rotational flow and sink flow coupling units includes a rotational flow cylinder 44, which is provided with a rotational flow rotor 43, and a flow guiding device 45 is equipped at the top of the rotational flow cylinder 44. The rotational flow rotor 43 includes an inner cylinder body 431 and rotational flow blades 432. The inner diameter of the flow guiding device 45 at a position where the flue gas flows out is less than that at a position where the flue gas flows in, and the inner diameter is narrowed to enable the flue gas passing through to achieve an effect of sink flow. The cross section of the flow guiding device 45 may be a trapezoid, as shown in FIG. 5a; it may also be in a shape of an inverted bowl, as shown in FIG. 5b; or it may also be in a shape of a hyperbola, as shown in FIG. 5c.

The rotational flow and sink flow coupling device 4 is mounted between the initial flue gas inlet of the absorption tower and the spray layer 3. The slurry sprayed from the spray layer 3 flows into the slurry pool of the absorption tower through the rotational flow and sink flow coupling device 4. The initial flue gas is fully mixed and comes in full contact with the sprayed slurry when passing through the rotational flow and sink flow coupling device 4, and enters the spray layer 3 after being cooling, washing, and going through absorption reactions. The rotational flow and sink flow coupling device 4 is formed with a plurality of the rotational flow and sink flow coupling units 41 evenly arranged on the cross section of the tower body, with each rotational flow and sink flow coupling unit 41 including a rotational flow rotor 43, a rotational flow cylinder 44 and a flow guiding device 45, and a plurality of rotational flow and sink flow coupling units 41 are combined into a rotational flow and sink flow coupling device 4 covering the whole cross section of the absorption tower through closing plates 46. The load of the rotational flow and sink flow coupling device 4 is sustained by the supporting beam 42.

Figure 4:
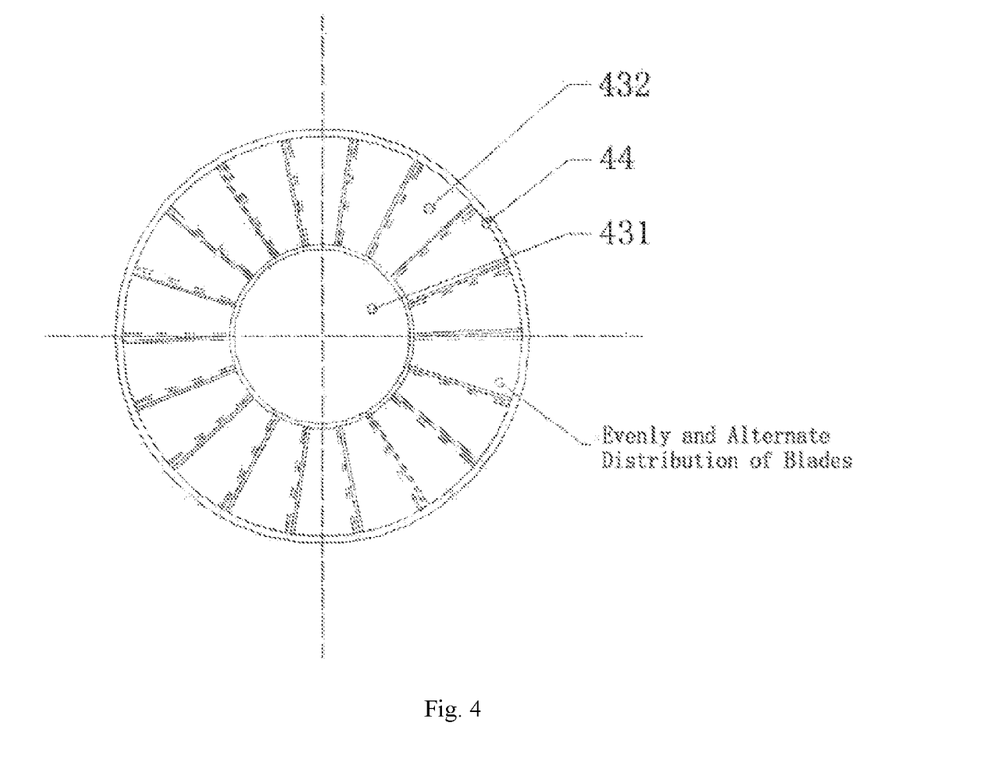
FIG. 4 is a schematic structural diagram of a rotational flow rotor and a rotational flow cylinder according to an embodiment of the present disclosure.

When the flue gas passes through the rotational flow and sink flow coupling device 4, the gas flow collides intensively with the slurry rotating at a high speed in the upper part of the rotational flow rotor 43 under the action of the rotational flow rotor 43, so that the gas flow is dispersed to a large number of fine bubbles to be mixed in the slurry, and the gas flow moving at a high speed provides the slurry with continuous rotary power. Fully mixing of the fine bubbles and the slurry enables rapid cooling of the flue gas, the increase of the gas-liquid film contact area improves the gas-liquid mass transfer effect, SO2 in the initial flue gas is absorbed and acted upon by the slurry, and the dust entrained in the flue gas is also washed. Bubbles in the rotary motion and the rotating slurry in the upper part of the rotational flow rotor 43 gradually move upward in the rotational flow cylinder 44. Blocked by the flow guiding device 45, the slurry falls down and returns to the upper part of the rotational flow rotor 43, while the gas passes through the flow guiding device 45 and continues to move upward to enter the spray layer 3. A plurality of evenly arranged rotational flow and sink flow coupling units 41 allow the initial flue gas passing through the rotational flow and sink flow coupling device 4 to be evenly arranged on the whole cross section of the absorption tower, and the slurry sprayed from the spray layer 3 continuously enters the rotational flow and sink flow coupling unit 41 through the flow guiding device 45. With the increase of the amount of the slurry in the rotational flow and sink flow coupling unit 41, it is impossible to continuously keep the slurry in the upper part of the rotational flow rotor 43, so that a portion of slurry near the lower end of the rotational flow rotor 43 is discharged from the rotational flow and sink flow coupling unit 41, and descends into the slurry pool 5.

Figure 3:
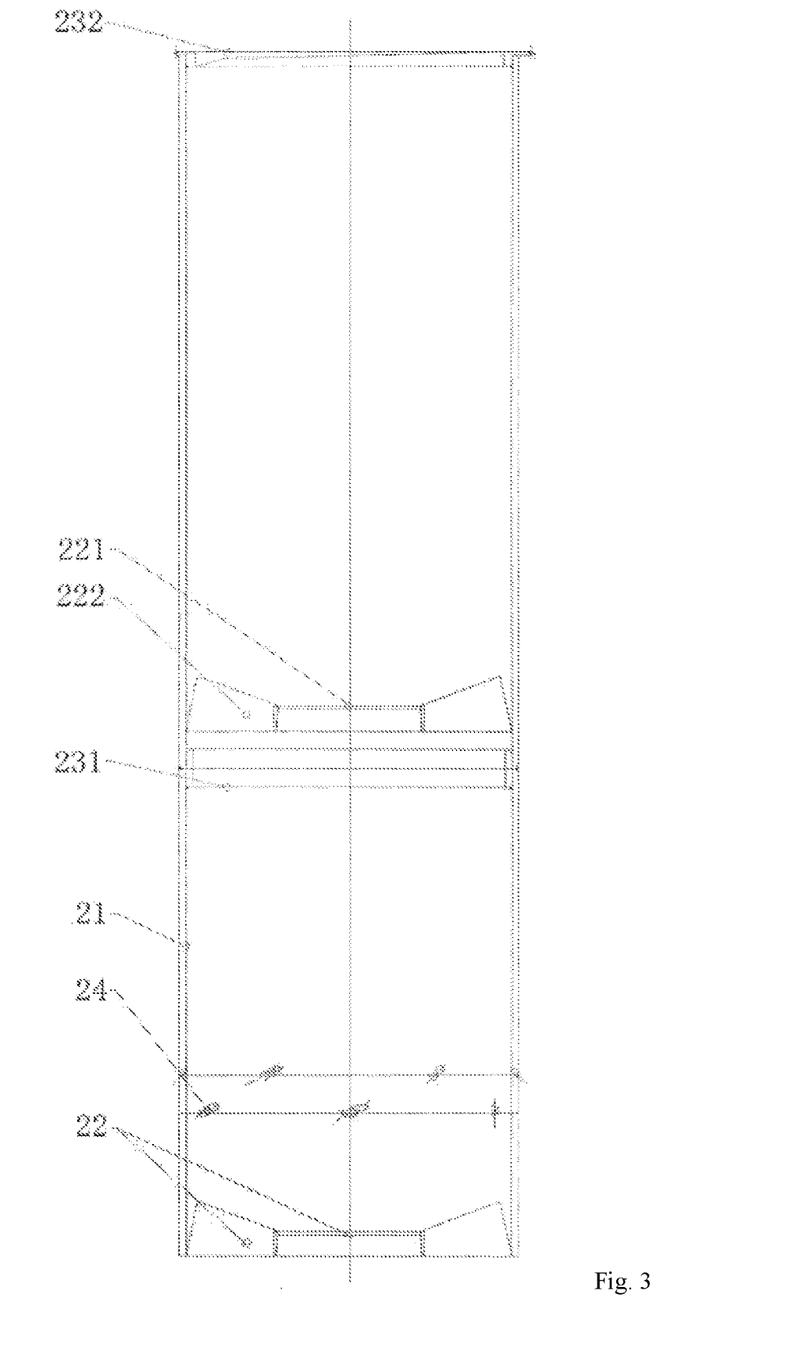
FIG. 3 is a schematic structural diagram of a dedusting and demisting unit according to an embodiment of the present disclosure.

The tube bundle-type dedusting and demisting device 2 includes a plurality of dedusting and demisting units. As shown in FIG. 3, each of the dedusting and demisting units includes a flow guiding cylinder 21 and an n number of turbulent flow rotors 22 provided inside the flow guiding cylinder ($n \geq 1$), and the n turbulent flow rotors 22 are disposed up and down perpendicularly to the wall of the flow guiding cylinder 21. The flow guiding cylinder 21 is a circular cylinder placed vertically. The dedusting and demisting unit further includes a water baffle ring 23 for forming a liquid film with a certain steady liquid volume in the dedusting and demisting unit; the water baffle ring 23 is an annular component with a certain thickness and height, it is attached to the inner wall of the flow guiding cylinder 21, and is a component in the dedusting and demisting unit for controlling a liquid holdup. The thickness and height parameters of the water baffle ring 23 are set in such a manner as to obtain maximum liquid holdup for the dedusting and demisting unit.

As shown in FIG. 3, the tube bundle-type dedusting and demisting device further includes a plurality of bleed holes 24 for controlling to forming a liquid film having a uniform thickness and rotating at a high speed on the inner wall surface of the flow guiding cylinder 21; the bleed holes 24 are apertures which has the same rotating direction as the rotating direction of the blades 222, and are tangent to the inner wall surface of the flow guiding cylinder 21. The tube bundle-type dedusting and demisting device has flushing assemblies allocated to each unit, where each flushing assembly is arranged on the central axis of the flow guiding cylinder 21 of the dedusting and demisting unit, and includes a flushing nozzle perpendicular to the inner wall of the flow guiding cylinder.

The flow guiding cylinder 21 is a flue gas flow passage component in the tube bundle-type dedusting and demisting device 2, and is a vertically placed circular cylinder with a smooth and flat inner wall surface and with both ends unclosed. The average flow rate of the flue gas flowing through a cross section of the flow guiding cylinder 21 is 2 to 8 m/s, and the average residence duration in the flow guiding cylinder is 0.1 to 0.5 s.

Figure 6:
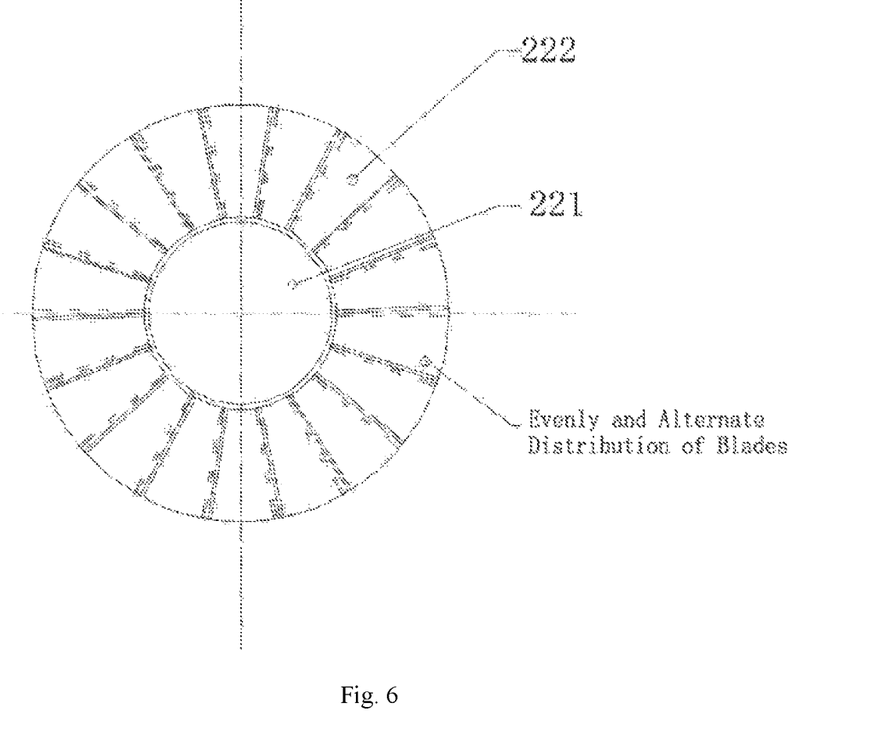
FIG. 6 is a schematic diagram of a turbulent flow rotor according to an embodiment of the present disclosure.

Turbulent flow rotors 22 are respectively placed at the flue gas inlet at the bottom of the flow guiding cylinder 21 and in the middle part of the flow guiding cylinder 21. The guiding function of the turbulent flow rotors 22 is to provide a dynamic environment for removal of mist drops and dust. The turbulent flow rotor 22 is a gas flow guiding component for guiding the flue gas passing through the dedusting and demisting device 2 to change its moving direction from top to bottom to rotary motion at a high speed, and includes a center cylinder 221 and blades 222. In order to ensure a relatively high dedusting and demisting efficiency, two-layer turbulent flow rotors are generally adopted.

Blades 222 are thin, curved, fan shaped components with a smooth surface, and are evenly arranged in the annular area between the center cylinder 221 and the flow guiding cylinder 21 at a certain inclination angle. The angle between the blades 222 and the center cylinder 221 is 20 degrees to 55 degrees, and a shielding rate between adjacent blades is −10% to 45%. The angle between the rotational flow blades 432 of the rotational flow rotor 43 and the inner cylinder body 431 and the shielding rate between the blade 432 and an adjacent rotational flow blade 432 may be the same as or different from those of the blade 222 of the turbulent flow rotor 22. The number, inclination angle and coverage area of the blades 222 may be adjusted according to a requirement of inlet dust content. Generally, the higher the inlet dust content of the initial flue gas is, the more the number of blades is; the smaller the inclination angle is, and the larger the coverage area is. Meanwhile, the inclination angles of the blades 222 are also related to the flowing rate through the flow guiding cylinder 21. The higher the flowing rate through the flow guiding cylinder 21 is, the larger the inclination angles of the blades 222 are. The angles of the blades 222 meet a standard that an actual speed of gas in rotary motion of the gas after its being guided by the blade is greater than or equal to 8 m/s.

The center cylinder 221 is a circular cylinder with a smooth external surface and its top end closed. The diameter of the center cylinder 221 is associated with the diameter of the flow guiding cylinder 21, and usually the cross sectional area of the center cylinder 221 is 15% to 50% of that of the flow guiding cylinder.

Two water baffle rings are provided inside the flow guiding cylinder 21, and are components in the dedusting and demisting device for controlling a liquid holdup. A primary water baffle ring 231 is arranged below the upper turbulent flow rotor 22, and a secondary water baffle ring 232 is arranged at the outlet of the flow guiding cylinder 21.

The thickness and height parameters of each water baffle ring affect the operating resistance of the device. When reasonable values for the thickness and height of the water baffle rings are set, a maximum liquid holdup in the device may be obtained. The capture function is greatly enhanced, and the operating resistance is also greatly increased. Therefore, the parameters of water baffle ring should be determined taken into account of the total amount of mist drops in the flue gas, a distribution of diameters of mist drop particles, diameters of dust particles and characteristics of dust particles, and the like.

On the flow guiding cylinder 21, two rows of bleed holes 24 are provided at a certain height on the lower part of the turbulent flow rotors 22, and evenly arranged at intervals on one cross section. The bleed holes 24 are tangent to the inner wall of the flow guiding cylinder 21, and have the same rotating direction as that of the blade 222. The bleed holes 24 in the lower row have larger hole diameters than the bleed holes 24 in the upper row. The number and hole diameters of the bleed holes 24 are adjusted according to the mist drop content at the flue gas inlet. The bleed hole 24 is a component in the dedusting and demisting device 2 for controlling liquid film thickness on the wall surface of the flow guiding cylinder 21. The bleed hole 24 is an aperture which has a same rotating direction as that of the blade 222, tangent to the inner wall surface of the flow guiding cylinder 21, and has smooth incision. The sizes, number and heights of deployment of the bleed holes 24 are associated with a total amount of mist drops in the flue gas, a distribution of diameters of mist drop particles, a diameter and characteristics of dust particles, and the like. The bleed holes 24 function to ensure that the mist drops and dust removed by the device are promptly discharged from the device, to avoiding formation of secondary mist drops caused by thickening of the liquid film, and to also avoid not being able to keep the liquid film after excessive liquid is discharged. Mist drops and dust moving at a high speed directly collide with the inner wall of the flow guiding cylinder 21 to generate a larger amount of finer secondary mist drops and dust.

Operations of a tube bundle-type dedusting and demisting device are now described with the typical clean flue gas obtained through limestone-plaster wet process desulphurization, containing a large amount of mist drops and requesting dedusting and demisting treatment as an example. Mist drop liquid particles contained in the clean flue gas obtained through limestone-plaster wet process desulphurization are formed from two sources, fine slurry droplets formed in internal collision of sprayed slurry and fine mist drops formed from cooling and condensation of saturated clean flue gas. Here, solid dust particles contained in the clean flue gas also have two sources, i.e. fine solid dust particles in the flue gas un-captured by slurry and insoluble plaster and limestone particles suspending in the slurry droplets, both of which are "dust" according to the existing measurement standard. The clean flue gas obtained through desulphurization has the characteristics of low temperature for saturation, high mist drop content and high dust content.

The clean flue gas carrying large quantities of mist drops and dust move upward, and enter the area of the tube bundle-type dedusting and demisting device 2. After the primary turbulent flow rotor 22 is passed through, the flow direction of the flue gas changes from moving vertically upward to rotating upward. Accordingly, the turbulence intensity of the gas flow is significantly strengthened. The probability of mutual collision of mist drops and dust in the clean flue gas in the violently turbulent gas phase is significantly increased, so that they are agglomerated into larger droplet particles to achieve partial removal.

Since there is a great difference in density for mist drops and powder dust in the gas flow rotating at a high speed, mist drops and powder dust in the gas flow rotating at a high speed gradually begin to move towards the direction of the wall surface under the centrifugal force. Under the action of gas flow, captured droplets are agglomerated and then form a layer of rotating liquid film with uniform thickness on the wall surface of the flow guiding cylinder 21. The rotating direction of the liquid film is the same as that of the gas flow. When the mist drops and dust are move close to the wall surface of the flow guiding cylinder 21 at a high speed, they come in contact with the rotating liquid film, are absorbed by the liquid film, and then are annihilated. In a case of insufficient film thickness of liquid film or no liquid film, mist drops and dust moving at a high speed make direct impact on the wall surface, and are bound to turn into finer mist drops and dust, making it impossible to achieve the purpose of demisting and dedusting. If the film thickness is overly large, the gas flow moving at a high speed can cut into the liquid on the surface of the liquid film and blow the liquid into mist drops. When the liquid film absorbing mist drops and dust rotates to the bleed holes 24, a portion of the liquid film can be discharged out of the device from the bleed holes 24, so as to achieve the purpose of stabilizing the liquid film thickness.

Liquid film at a certain height is blocked by the water baffle ring 23, damaged and scattered into liquid drops to fall down and return to the upper part of the turbulent flow rotor 22. Large amounts of liquid drops are formed within the cavity of the dedusting and demisting unit, and come in contact with the flue gas entering the dedusting and demisting unit, thereby achieving capture of mist drops and dust; the captured mist drops and dust are thrown onto the liquid film along with the high speed gas flow, such that liquid film is re-scattered into liquid drops by the water baffle ring 23.

The rotating liquid film repeatedly washes out the wall surface of the flow guiding cylinder 21, thereby effectively preventing blockage and scale formation caused by plaster crystallization. High speed gas flow washes out the surfaces of the blades 222, but the minimum space between blades is 20 mm or more. Therefore, there will be no blockage and scale formation.

As the gas flow further moves upward, the angular velocity of rotation gradually starts to decline, but a portion of finer mist drops and dust have not been removed. Accordingly, another turbulent flow rotor 22 is provided to repeatedly provide a high speed rotating environment for the gas flow. Then a repeated processing of agglomeration, capture and annihilation of mist drops and dust removal are performed, and purification of mist drops and dust in the flue gas are achieved eventually. The operating resistance of the tube bundle-type dedusting and demisting device 2 is only 350 Pa, and the removal effect can meet 5 mg/Nm3 of a dust emission concentration at the outlet.

The tube bundle-type dedusting and demisting device 2 is made of a high-strength PP material, which is light in weight and low in cost, and meets the requirements of corrosion resistance and structural strength. The flow rate of the running flue gas is higher than the flow rate of flue gas in the cross section of the absorption tower. The tube bundle-type dedusting and demisting device 2 can be directly deployed inside the absorption tower, and its deployment is simple and convenient.

The number of the rotational flow and sink flow coupling units 41 in the rotational flow and sink flow coupling device depends on the flow rate of gas flowing through the system under working conditions. In general, the number of the rotational flow and sink flow coupling units 41 is designed in accordance with 20000~25000 m3/h flow rate of flue gas flowing through each unit under working conditions. After the flue gas passes through the rotational flow and sink flow coupling device 4 and the spray layer 3, SO2 is removed from the flue gas, and the flue gas temperature is reduced to its saturation temperature. Accordingly, the flow rate of the flue gas under working conditions is reduced.

The number of the dedusting and demisting units depends on a flow rate of the flue gas at an outlet of the tower body 1 under working conditions, and is designed in accordance with 2000~2500 m3/h flow rate of flue gas flowing through each unit under working conditions.

When the inlet flue gas is saturated flue gas, the ratio of a number a of the dedusting and demisting units to a number b of the rotational flow and sink flow coupling units is as follows: a:b=(9~10):1; and when the inlet flue gas is unsaturated flue gas, the ratio of the number a of the dedusting and demisting units to the number b of the rotational flow and sink flow coupling units is as follows: a:b=(5~9):1.

A rotational flow and sink flow coupling integrated method for ultra-clean desulphurization and dedusting according to an embodiment of the present disclosure includes slurry spray and circulation, gas-liquid rotational flow and sink flow coupling contact and reaction, slurry oxidation and plaster crystallization, and tube bundle-type dedusting and demisting of outlet flue gas. The initial flue gas enters the desulphurization absorption tower body 1 through an induced draft fan or a booster fan, successively flows through the rotational flow and sink flow coupling device 4, the spray layer 3 and the tube bundle-type dedusting and demisting device 2 from bottom to top, and is finally discharged into a chimney for emission through a clean flue channel after purification through desulphurization and dust removal is done. After entering the absorption tower, the initial high-temperature flue gas is first fully mixed and comes in full contact with the slurry sprayed from the spray layer 3 in the rotational flow and sink flow coupling device 4, thereby realizing preliminary purification after cooling, washing and absorption by the slurry. Temperature of the initial flue gas is decreased, most of SO2 is removed here, and a portion of dust is washed and captured by the slurry within the rotational flow and sink flow coupling device 4. When passing through the spray layer 3, the flue gas at the outlet of the rotational flow and sink flow coupling device 4 comes in countercurrent contact with the slurry sprayed from the spray layer 3 to achieve further desulphurization, so that the concentration of SO2 at the inlet of the bundle-type dedusting and demisting device 2 is further reduced to 35 mg/Nm3 or lower. The slurry sprayed from the spray layer 3 is derived from the slurry in the slurry pool 5 of the absorption tower, which is pressurized by a slurry circulating pump, and then sprayed through the nozzle of the spray layer, where the working pressure of the nozzle is 0.04~0.1 MPa, the average particle diameter of the sprayed liquid drops is ~2 mm, and the liquid-gas ratio is 5~20. Here, the flue gas temperature is further reduced, where the water vapor concentration reaches a saturated state. When leaving the spray layer 3, the flue gas not only contains remaining microdust uncaptured by liquid drops in the rotational flow and sink flow coupling device 4 and the spray layer 3 in the initial flue gas, but also entrains a portion of fine slurry droplets formed in the spray layer. The flue gas after desulphurization enters the tube bundle-type dedusting and demisting device 2 at an average flow rate of 2~6 m/s in a cross section of the absorption tower. In the bundle-type dedusting and demisting device 2, fine slurry droplets and microdust remaining in the flue gas are captured and removed. The total amount of dust at an outlet of the tube bundle-type dedusting and demisting device 2 is controlled to be 5 mg/Nm3 or less. The flue gas is completely purified to clean flue gas, and is discharged into the chimney for emission through a flue channel at the outlet of the absorption tower. The dust and slurry droplets captured by the tube bundle-type dedusting and demisting device 2 converge, then leave the tube bundle-type dedusting and demisting device 2, and flow into the slurry pool 5 in the lowermost part of the absorption tower by gravity. The dust and slurry remaining in the tube bundle-type dedusting and demisting device 2 are regularly flushed by the flushing assembly of the tube bundle-type dedusting and demisting device; the flushing water of the tube bundle-type dedusting and demisting device 2 is provided by the process water pumped by a flush water pump of the tube bundle-type dedusting and demisting device, where the working pressure of the flushing water is 0.1~0.4 MPa.

The integrated system for ultra-clean desulphurization and dedusting according to an embodiment of the present disclosure is low in investment cost and low in operating cost, in addition to meeting stricter environmental requirements, thereby facilitating construction of new desulphurization systems and transformation of old desulphurization systems.

A rotational flow and sink flow coupling integrated method for ultra-clean desulphurization and dedusting provided by embodiments of the present disclosure is applied to the above integrated system for ultra-clean desulphurization and dedusting, and includes the following steps:

step 1: slurry oxidation and plaster crystallization

Oxidized air is insufflated into the slurry pool 5, and fully mixed with limestone-plaster slurry under the action of a stirrer, so that calcium sulfite in the slurry is oxidized into calcium sulfate, and then calcium sulfate is crystallized into plaster particles.

step 2: slurry spraying and circulating

According to a state of initial flue and requirements on clean flue gas (5 mg/Nm3 dust emission concentration), the slurry obtained from step 1 is pumped into multiple spray layers 3 using a circulating pump for spraying, and the sprayed slurry flows back to the slurry pool 5, where the working pressure of the nozzle in the spray layer 3 is 0.04~0.1 MPa, the average particle diameter of the sprayed liquid drops is ~2 mm, and the liquid-gas ratio is in the range of 5~20.

step 3: rotational flow and sink flow coupling contact of gas and liquid and reaction of gas and liquid The rotational flow blades 432 are used to change the flow direction of the flue gas from bottom to top in the tower, so that the flow direction of the flue gas changes from moving vertically upward to rotating upward at an increases speed. The flue gas comes in contact with the slurry sprayed from the spray layer 3 to remove SO2 and a portion of dust. Then the flue gas converges to the center of the rotational flow and sink flow coupling unit 41 due to the constraints of a narrowed inner diameter of the flow guiding device 45. The slurry mixed with the flue gas, blocked by the flow guiding device 45, falls down and returns to the upper part of the rotational flow rotor 43. Driven by the rotational flow blade 432, the flue gas obtains a high rotation speed, reaching a linear velocity of the flue gas particle at around 10-15 m/s, the velocity field distribution gradually decreases from the center to the edge along the rotational flow blade, and the velocity vector direction is rotating upward along the inclination direction of the rational flow blade. The high speed gas flow is intensively mixed with a large amount of slurry, and is dispersed into massive fine bubbles. Driven by the high speed gas flow, the slurry also rotates at a high speed in the rotational flow and sink flow coupling device, and the maximum liner velocity of rotation of the slurry can reach 5 m/s. In the rotational flow and sink flow coupling device, mixing, contact and reaction of the flue gas with the slurry can be completed with an average flow rate in a cross section of around 2-6 m/S. The rotating flow rate and amount of the slurry in the rotational flow and sink flow coupling device are reduced with the decrease of the average flow rate in the cross section, but the average contact time of the flue gas and the slurry is increased with the decrease of the average flow rate in a cross section. The duration time of gas-liquid mixing, contact and reaction of the flue gas with the slurry in the rotational flow and sink flow coupling device is around 0.2-0.5 S.

step 4: preliminary dedusting and demisting

The flue gas after desulphurization in step 3 enters the tube bundle-type dedusting and demisting device 2 at an average flow rate of 2~6 m/s in a cross section of the absorption tower to form mist drop liquid particles and dust particles, the mist drop liquid particles and dust particles are agglomerated into larger particles using the turbulent flow rotor 22 provided in the lower part of the dedusting and demisting unit, and then the larger particles precipitate. The average flow rate of the flue gas flowing through a cross section of the flow guiding cylinder 21 is 2 to 8 m/s, and average residence duration in the flow guiding cylinder is 0.1 to 0.5 S.

step 5: further dedusting and demisting

After preliminary dedusting and demisting in step 4, the flue gas that continues moving upward at a high speed comes in full contact with mist drop liquid particles and solid dust particles, and liquid is captured to achieve separation.

The clean flue gas carrying lots of mist drops and dust move upward smoothly at a flow rate of 3.5 m/s, and enters the tube bundle-type dedusting and demisting device 2. The flow rate of the flue gas upon entering the tube bundle-type dedusting and demisting device 2 is increased to 5 m/s. After the primary turbulent flow rotor 22 is passed through, the flow rate of the gas flow particle is increased to 8 m/s or more, and the gas flow direction changes from moving vertically upward to rotating upward. Accordingly, the turbulence intensity of the gas flow is significantly strengthened. The probability of mutual collision of mist drops and dust in the clean flue gas in the violently turbulent gas phase is significantly increased, so that they are agglomerated into larger droplet particles to achieve partial removal.

step 6: deep dedusting and demisting

After further dedusting and demisting of the flue gas in step 5, mist drop liquid particles and solid dust particles rotate with the flue gas. Due to a large difference in density of mist drop liquid particles and solid dust particles from gas, mist drops and dust in the gas flow rotating at a high speed gradually start to move towards the direction of the wall surface driven by a centrifugal force. Under the action of gas flow, captured droplets are agglomerated and then form a layer of rotating liquid film with uniform thickness on the inner wall surface of the flow guiding cylinder 21. Rotating direction of the liquid film is the same as that of the gas flow. When the mist drops and dust are close to the wall surface at high speed state, they contact with the rotating liquid film, are absorbed by the liquid film, and then are annihilated. When the liquid film having absorbed mist drops and dust rotates to the bleed holes 24, a portion of the liquid film is discharged from the bleed holes 24. The operating resistance of the tube bundle-type dedusting and demisting device 2 is 350 Pa, the removal effect reaches a 5 mg/Nm3 outlet dust emission concentration, and the droplet content is 25 mg/Nm3 or less.

The foregoing description is only preferred combination of embodiments of the present disclosure, which are not intended to limit the present disclosure. Any modification, equivalent replacement, improvement or the like made within the spirit and principles of the present disclosure should be included within the scope of protection of the present disclosure.

What is claimed is:

1. A rotational flow and sink flow coupling integrated system for desulphurization and dedusting, comprising
a spray layer mounted in a tower body,
a slurry pool situated below the tower body,
a circulating pump mounted in the slurry pool,
a rotational flow and sink flow coupling device which is mounted above the slurry pool and below the spray layer, and
a tube bundle-type dedusting and demisting device arranged on the top of the tower body, wherein
the rotational flow and sink flow coupling device comprises:
a plurality of rotational flow and sink flow coupling units, and
one or more supporting beams, located below the rotational flow and sink flow coupling units, for supporting the rotational flow and sink flow coupling device, wherein
adjacent rotational flow and sink flow coupling units are connected with a closing plate,
each of the plurality of rotational flow and sink flow coupling units comprises a rotational flow cylinder, wherein
a flow guiding device is arranged on top of the rotational flow cylinder,
the rotational flow cylinder includes a rotational flow rotor, and
the rotational flow rotor comprises an inner cylinder body and rotational flow blades, wherein a first inner diameter of the flow guiding device at a first position where the flue gas flows out is less than a second inner diameter of the flow guiding device at a second position where the flue gas flows in; and
the tube bundle-type dedusting and demisting device comprises a plurality of dedusting and demisting units, each of which comprises a flow guiding cylinder and a number of n turbulent flow rotors inside the flow guiding cylinder, where n≥1, wherein the turbulent flow rotors are positioned perpendicularly to a wall of the flow guiding cylinder.

2. The system according to claim 1, wherein flow guiding cylinders, included in the plurality of dedusting and demisting units, are circular cylinders and are placed vertically.

3. The system according to claim 2, wherein the number of n, diameters, and heights of the flow guiding cylinders included in the plurality of dedusting and demisting units are determined based at least in part on one of: whether outlet dust content is less than or equal to 5 mg/Nm$^3$, whether an average flow rate of flue gas flowing through a cross section of a flow guiding cylinder is 5 to 6 m/s, and whether residence duration of the flue gas is 0.2 to 0.3 S.

4. The system according to claim 2, wherein a blade in the rotational flow blades is configured to have an inclination angle that guides after gas and produces a rotation speed of greater than or equal to 8 m/s for the after gas.

5. The system according to claim 1, wherein the number of n, diameters, and heights of the flow guiding cylinders included in the plurality of dedusting and demisting units are determined based at least in part on one of: whether outlet dust content is less than or equal to 5 mg/Nm$^3$, whether an average flow rate of flue gas flowing through a cross section of a flow guiding cylinder is 5 to 6 m/s, and whether residence duration of the flue gas is 0.2 to 0.3 S.

6. The system according to claim 1, wherein each of the turbulent flow rotors comprises one or more blades evenly arranged in an annular area between an outer wall of a center cylinder and an inner wall of a flow guiding cylinder.

7. The system according to claim 6, wherein a blade in the one or more blades is configured to have an inclination angle that guides after gas and produces a rotation speed of greater than or equal to 8 m/s for the after gas.

8. The system according to claim 1, wherein there is an angle of 20 degree to 55 degree between a blade of a turbulent flow rotor and a center cylinder, and a shielding rate between adjacent blades is between −10% and 45%.

9. The system according to claim 8, wherein the center cylinder is a circular cylinder with its top end closed, and its cross sectional area is 15% to 50% of that of the flow guiding cylinder.

10. The system according to claim 1, wherein a water baffle ring is provided on an inner wall of the flow guiding cylinder of the bundle-type dedusting and demisting device, for forming a liquid film containing a predefined amount of liquid.

11. The system according to claim 10, wherein thickness and height of the water baffle ring are determined to provide a maximum liquid holdup.

12. The system according to claim 1, wherein the tube bundle-type dedusting and demisting device comprises one or more bleed holes for controlling an inner wall surface of the tube bundle-type dedusting and demisting device to form a liquid film having uniform thickness and rotating at a high speed; the one or more bleed holes are apertures having a same rotating direction as that of the blades and are tangent to an inner wall surface of the flow guiding cylinder.

13. The system according to claim 1, wherein the tube bundle-type dedusting and demisting device has flushing assemblies allocated to each dedusting and demisting unit, wherein each flushing assembly is arranged on a central axis of the flow guiding cylinder of the dedusting and demisting unit and comprises a flushing nozzle perpendicular to an inner wall of the flow guiding cylinder.

14. A rotational flow and sink flow coupling integrated method for desulphurization and dedusting, comprising:
a slurry oxidation and plaster crystallization step which comprises:
insufflating oxidized air into a slurry pool, and
mixing the oxidized air with limestone-plaster slurry using a stirring device to produce a slurry, to oxidize calcium sulfite contained in the slurry into calcium sulfate and, to crystallize the calcium sulfate into plaster particles;

a slurry spraying and circulating step which comprises:
  according to a state of flue gas and a clean requirement of the flue gas, pumping the slurry processed in the slurry oxidation and plaster crystallization step into multiple spray layers using a circulating pump to spray the slurry, a rotational flow and sink flow coupling contact of gas and liquid and reaction of gas and liquid step which comprises:
  using rotational flow blades installed on a rotational flow and sink flow coupling device to change a flow direction of the flue gas flowing from bottom to top in a tower, to rotate the flue gas upward, and to increase a movement speed of the flue gas; and
  spraying the slurry on a spray layer to make the slurry flowing from top to bottom in the tower to come in contact with the flue gas, thereby causing a portion of the flue gas to converge to a center of the tower, causing the flue gas to continue its rotational flow upward and to converge with the slurry based on constraints of a narrowed inner diameter of a flow guiding device, and causing the slurry to descend towards the center of the tower for desulphurization and slurry washing in order to remove a portion of dust;

a first dedusting and demisting step which comprises:
  flowing the flue gas upwards, at a predefined speed, into a tube bundle-type dedusting and demisting device, and
  causing, using one or more turbulent flow rotors installed on a lower part of the dedusting and demisting device, mist drops and liquid particles contained in the flue gas to collide with solid dust particles and agglomerate into larger particles and the larger particles to precipitate;

a second dedusting and demisting step which comprises:
  making, the mist drops and liquid particles and the solid dust particles in the flue gas move upward at a first predefined speed in the tube bundle-type dedusting and demisting device, to come in contact with a liquid film adhered to the inner wall surface of the flow guiding cylinder of the tube bundle-type dedusting and demisting device, and
  capturing liquid to achieve separation; and a third dedusting and demisting step which comprises:
  causing the flue gas moving upward at the first predefined high speed to rotate at a second speed to centrifugally separate the mist drops and liquid particles and the solid dust particles from the flue gas,
  causing, the mist drops and liquid particles and the solid dust particles that have been separated from the flue gas, to come in contact with an inner wall surface of a flow guiding cylinder of the tube bundle-type dedusting and demisting device, and
  causing, the mist drops and liquid particles and the solid dust particles that have been separated from the flue gas, to react to the liquid film.

* * * * *